Oct. 26, 1954

B. J. BIGLER 2,692,467

COTTON HARVESTER

Filed May 1, 1953

INVENTOR.
BENJAMIN J. BIGLER
BY
McMorrow, Berman + Davidson
ATTORNEYS

Oct. 26, 1954

B. J. BIGLER 2,692,467

COTTON HARVESTER

Filed May 1, 1953

INVENTOR.
BENJAMIN J. BIGLER
BY
McMorrow, Berman & Davidson
ATTORNEYS

Oct. 26, 1954  B. J. BIGLER  2,692,467
COTTON HARVESTER

Filed May 1, 1953  3 Sheets-Sheet 3

INVENTOR.
BENJAMIN J. BIGLER
BY
McMorrow, Berman & Davidson
ATTORNEYS

Patented Oct. 26, 1954

2,692,467

UNITED STATES PATENT OFFICE 2,692,467

COTTON HARVESTER

Benjamin J. Bigler, Temple, Tex.

Application May 1, 1953, Serial No. 352,551

1 Claim. (Cl. 56—33)

This invention relates to apparatus for harvesting cotton, and more particularly, has reference to apparatus of this type adapted to be mounted upon a tractor or similar vehicle, and further adapted to take its power from he power take-off of said vehicle.

An important object of the present invention is to provide harvesting apparatus as described which will be particularly designed to facilitate proper locating of a plant to be stripped of cotton bolls, relative to stripper rolls of the apparatus. To this end, I propose to so construct the stripper rolls as to form the same with tapered leading ends, the tapered leading ends of adjacent stripper rolls being adapted to define therebetween a tapered throat into which the plants to be stripped will move, thus to guide said plants to the space between the stripper rolls.

Another important object is to provide, for coaction with said stripper rolls, paired brush rolls, the brush rolls having flared leading ends that complement and are in mesh with the tapered leading ends of the stripper rolls, the construction being designed to insure the removal of the bolls from the stripper rolls by the brush bolls, for transfer of said rolls to opposite sides of the roll housing.

Another object of importance is to provide, in a structure of the type described, a housing formation wherein said housing will have an open front end and a longitudinally and centrally disposed bottom opening in communication with said front end, said bottom opening and front end being adapted to define a space through which the plants to be stripped will pass, the housing further having depending side troughs in which cleaner rolls will be mounted, said side troughs being adapted to receive the bolls from the brush rolls, give the bolls an initial cleaning, and transfer said bolls to the rear end of the housing.

Another object of importance is to provide a harvesting attachment as described wherein the roll housing will be so mounted upon its associated tractor as to permit the front and the rear ends of said roll housing to be adjustable upwardly and downwardly, with each end of the housing being adjustable independently of the other.

Another object of importance is to provide a cotton harvesting structure as stated wherein the roll housing will be supported by a suitable frame, said frame being fixedly mounted upon the tractor and being adapted to facilitate access to the drive means for the stripper, brush, and cleaner rolls of the apparatus.

Another object of importance is to provide a drive linkage for a cottoin harvesting structure, which drive linkage will be designed for connection at one end to the power take-off of a tractor, the drive linkage being so arranged as to drive a blower, the stripper rolls, the brush rolls, and the cleaner rolls, with the several driven elements being operated simultaneously during use of the apparatus.

Other objects will appear from the following description, the claims appended thereto, and from the annexed drawings, in which like reference characters designate like parts throughout the several views, and wherein:

Figure 5 is a transverse sectional view on an enlarged scale, taken substantially on line 5—5 of Figure 1; and Figure 6 is a greatly enlarged perspective view of one of the stripper rolls, per se.

Figure 1:
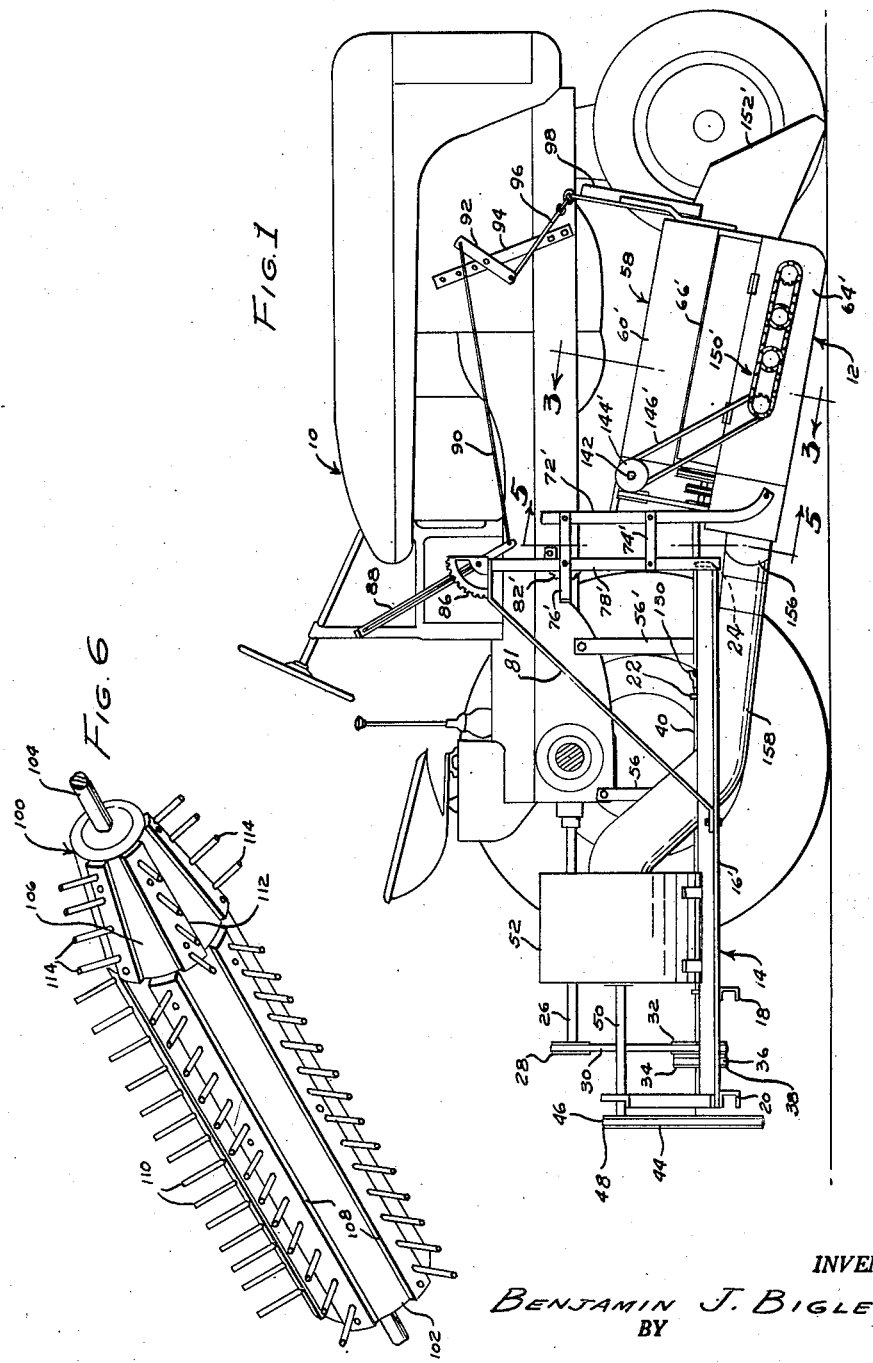
Figure 1 is a side elevational view with parts broken away and shown in section, of a cotton harvesting apparatus formed in accordance with the present invention, as it appears when mounted upon a conventional tractor having one rear wheel removed.

The cotton harvesting apparatus constituting the present invention is adapted to be mounted upon a conventional tractor 10. The apparatus has been designated generally by the reference numeral 12, and includes a support frame designated generally at 14.

The support frame is formed with elongated, horizontally disposed, side rails 16, 16', said side rails being spaced transversely of the apparatus and being disposed at one side of the tractor 10. The side rails 16, 16' are coextensive in length, and are fixedly connected in transversely spaced relation by cross bars 18, 20, 22, and 24. The several cross bars are spaced longitudinally of the side rails 16, 16', and it is thus seen that a horizontally disposed, substantially rectangular, open framework is provided, which framework is adapted to support the remaining parts of the apparatus.

The reference numeral 26 has been applied to designate a shaft extending from the power take-off of the tractor 10. Shaft 26 is extended rearwardly from the rear end of the tractor for a substantial distance, and has a drive pulley 28 connected thereto. Trained about the pulley 28 is a belt 30, said belt 30 being trained about a driven pulley 32. Pulley 32 is secured to a pulley 34 for rotation therewith, and trained about the pulley 34 is a belt 36.

Belt 36 passes around a pulley 38, to drive the same, said pulley 38 being secured to an elongated drive shaft 40 for the several rolls of the harvesting apparatus. The elongated drive shaft 40 is extended between the side rails 16, 16', and is in parallelism with said side rails, the drive shaft 40 being journaled in suitable bearings provided upon the cross bars of the frame.

The pulleys 32, 34 are keyed to or otherwise made rotatable with a jack shaft 42 journaled in bearings carried by the cross bars 18, 20, and rotatable by said jack shaft is a large pulley 44 about which is trained belt 46 passing around pulley 48 secured to the shaft 50 of a blower mounted within a blower housing 52, which housing is provided with an outlet 54. It will be understood that the outlet 54 will, in use of the apparatus, be connected to a suitable outlet duct or receiver, to which the harvested bolls will be conveyed.

The support frame can, of course, be fixedly secured to the tractor 10 in any suitable manner, and in the illustrated example of the invention, said frame is rigidly fastened to the side of the tractor by means of hangers 56, 56'.

Figure 3:
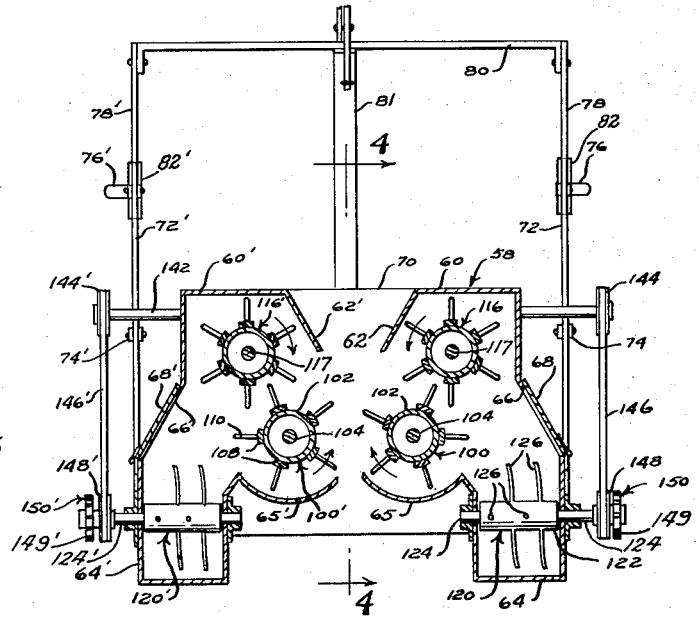
Figure 3 is a transverse sectional view, on an enlarged scale, taken substantially on line 3—3 of Figure 1.

The roll housing has been designated generally at 58, and as shown in Figure 3, is formed with side portions 60, 60' disposed at opposite sides of the longitudinal center line of said housing. Longitudinally and centrally of the housing, there is an open space, and at opposite sides of said open space, the top wall of the housing is formed with downwardly converging wings 62, 62'. The wings 62, 62' are so disposed as to protectively enclose the roll means mounted in the housing, thereby to eliminate or substantially reduce the possibility of the harvested bolls being discharged accidentally through the open portion of the housing top wall.

The opposite side walls of the housing 58 are offset outwardly at their lower ends, to form the outer wall portions of depending side troughs 64, 64' extending longitudinally of the respective sides of the housing. The side troughs have inner walls merging at their upper edges into inwardly extending, transversely depressed, bottom wall portions 65, 65'.

In the side walls of the housing I provide openings 66, 66' said openings being normally closed by access doors 68, 68'. The access doors are so disposed as to permit maintenance, cleaning, and repair of the mechanisms disposed within the housing.

At its rear end, the housing is closed by a rear end wall 70, said rear end wall serving to protect the drive linkage of the structure from the plants harvested by the housing. Thus, the plant stalks remaining after the bolls have been stripped therefrom are bent forwardly by the lower edge portion of the rear end wall 70, so as to prevent said stalks from fouling the drive linkage.

The roll housing 58 is supported by the frame 14, and is disposed forwardly of said frame. At its rear end, the housing 58 is connected to the forwardly curved lower ends of hanger bars 72, 72'. The bars 72, 72' are pivotally connected (see Figure 1) to the front ends of vertically spaced, substantially horizontally disposed, connecting members 74, 74', 76, 76', the members 76 and 76' being formed with a handle portion at its rear end. The connecting members 74, 74' and 76, 76' are pivotally connected to stationary support posts 78, 78', which support post is fixedly secured to and extends upwardly from the front end of the frame 14. It will be understood that a pair of posts 78, 78' is provided, the posts of said pair being spaced transversely of the frame and being each connected to members 74, 76 and 74' and 76' respectively.

At their upper ends, the support posts 78, 78' are bolted or otherwise fixedly connected to the opposite ends of a cross brace 80 (Figure 3). Medially between its ends, cross brace 80 is secured to the upper end of a vertical brace 81, said vertical brace being affixed at its lower end to the front end of the frame 14.

A toothed segment 82, 82' is rigid with the respective support posts 78, 78', the handle portions of members 76, 76' being formed with suitable detent means engageable in selected notches of the segments.

It will be thus apparent that the rear end of the housing 58 is adjustably suspended from the front end of frame 14, and is adjustable vertically to selected elevations relative to the ground surface. To adjust the rear end of housing 58 vertically to a selected elevation, it is merely necessary that the handle portions of the connecting members 76, 76' be grasped, and shifted to selected locations on the segments 82, 82'. This will cause the hanger bars 72, 72' to be swung upwardly or downwardly, as desired, thereby to adjust, in turn, the rear end of the housing 58.

Fixedly mounted upon the cross member 80, intermediate the opposite ends of said cross member, is a toothed segment 86, and adapted to traverse said segment is a latch handle 88, said handle being provided with detent means engageable in a selected notch of the segment 86.

Handle 88 is pivotally mounted upon the segment 86, and at its lower end is pivotally connected to one end of an elongated rod 90, the rod 90 being pivotally joined at its forward end to one end of a rockable lever 92 fulcrumed intermediate its ends upon a rigid support bar 94 secured to the tractor 10.

Pivotally attached at one end to the lower end of the bar 92 is a link 96, said link 96 being pivotally joined, at its front end, to the midlength portion of an arcuate frame member 98 extending transversely of the front end of the housing 58. Frame member 98 is welded or otherwise fixedly joined, at its opposite ends, to the opposite sides of the front end of the housing.

By reason of this construction, it is seen that by adjustment of latch handle 88 to selected positions, the front end of the housing 58 will be shifted vertically to selected elevations. Thus, the housing 58 is adjustable vertically at either or both ends thereof. The adjustment of either end of the housing is made independently of the other end of the housing, thus to permit the housing to be disposed at exact positions of longitudinally tilted adjustment, as well as at accurately determined elevations. These adjustments facilitate the proper location of the device relative to the plants to be harvested, it being understood that the height of the plants, and the locations thereon at which the main concentrations of bolls are disposed, will understandably affect the adjustments selected for the housing.

Within the housing there are provided a plurality of rolls adapted to act upon the plants, for the purpose of removing the bolls therefrom. Thus, I utilize a pair of stripper rolls designated by the reference numerals 100, 100'. The construction of each stripper roll has been illustrated to advantage in Figure 6, and it will be noted that said roll includes an elongated cylinder 102, the end walls of which are fixedly secured to an axially disposed shaft 104.

The cylinder 102 of each stripper roll is formed, at its leading end, with a tapered portion 106.

Rearwardly of said tapered portion, the cylinder 102 is provided with a circumferential series of finger support bars 108, said bars 108 extending longitudinally of the cylinder fully from the base of the tapered portion 106 to the trailing end of the cylinder. Mounted upon each bar 108 is a longitudinal series of radially extended stripper fingers 110, said fingers 110 being spaced equal distances apart longitudinally of the stripper roll.

On the tapered portion 106 there is provided a circumferential series of relatively short finger support bars 112, on which radially extended fingers 114 are mounted.

It will thus be seen that the stripper fingers of each roll 100 are arranged in longitudinally extending, circumferentially spaced rows. It will further be seen that the rows of fingers on the tapered leading end of each cylinder are staggered circumferentially of the cylinder, relative to the rows of fingers on the remaining part of the cylinder.

At 116, 116', I have generally designated a pair of brush rolls. The brush rolls are formed like the stripper rolls, to the extent that said brush rolls have elongated cylinders secured to axially disposed shafts 117. Further, the brush rolls have circumferentially spaced, longitudinally extending finger support bars on which are mounted outwardly and radially extended brush fingers. Each of the brush rolls, at their leading ends, is flared as at 118, the flare of each brush roll being complementary to the taper of the stripper roll adjacent thereto.

It will also be noted that the rows of brush fingers mounted upon the flared leading end portions of the brush rolls are staggered circumferentially of the brush rolls relative to the rows of brush fingers mounted upon the constant diameter portions of the brush roll cylinders. In the respective side troughs 64, 64', I mount cleaner rolls designated generally by the reference numeral 120, 120'. In each side trough 64 there is provided a longitudinal series of cleaner rolls, with the rolls of said series being extended transversely of the trough, fully from side to side of the trough. Each cleaner roll includes a cylinder 122, and secured to said cylinder for rotating the same is an axially extended shaft 124 journaled at its opposite ends in the side wall of the trough. Fixedly connected to the cylinder 122 are radially extending fingers 126, said fingers being slightly curved longitudinally and being arranged in rows extending longitudinally of the cylinder 122, said rows being spaced circumferentially about the cylinder. The fingers of each row are staggered longitudinally of the cylinder relative to the fingers of each adjacent row (Figure 3).

Figure 2:
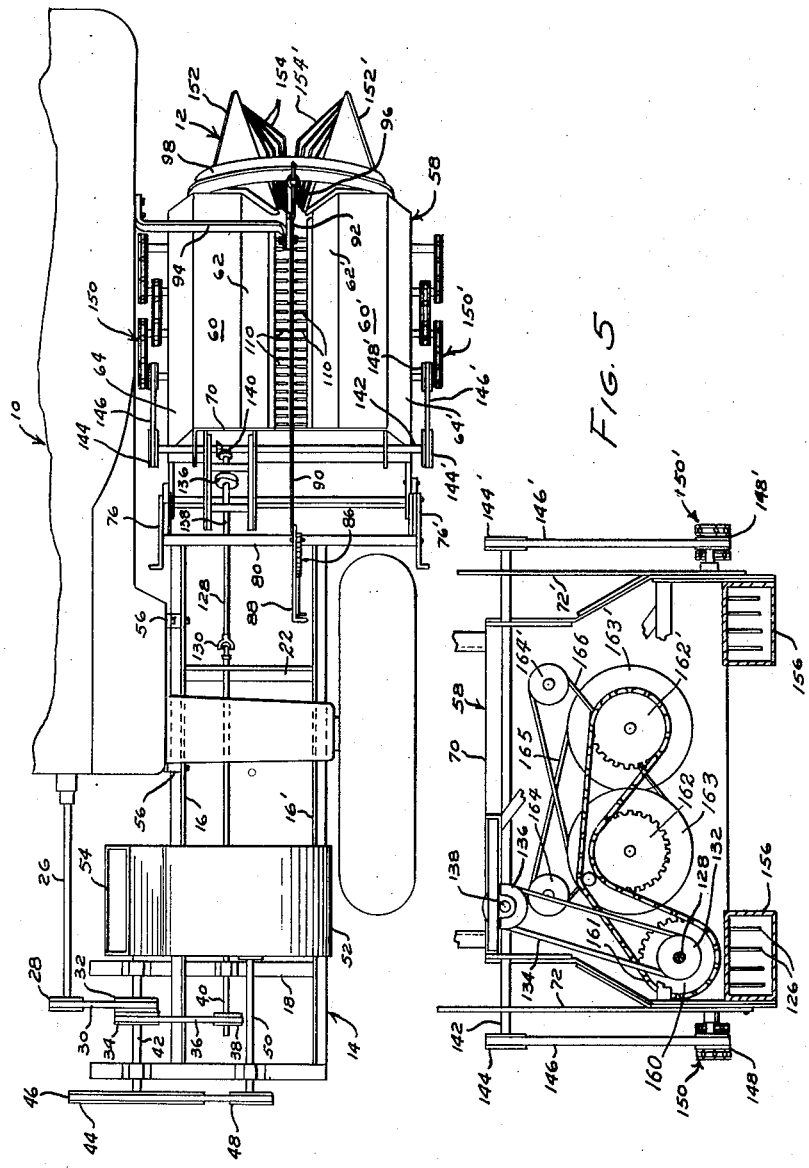
Figure 2 is a top plan view of the apparatus in which the tractor has been illustrated fragmentarily.
Figure 4:
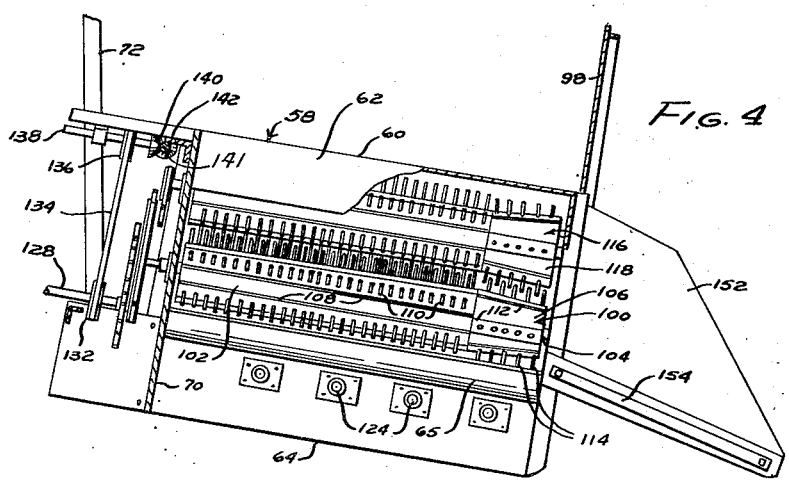
Figure 4 is a longitudinal sectional view taken substantially on line 4—4 of Figure 3 with parts broken away and shown in section.

The drive means for the several rolls will now be described, and as will be noted from Figure 2, a drive shaft extension 128 is connected to the drive shaft 40 by a universal joint 130. The extension 128 has a pulley 132 secured thereto, and trained about said pulley 132 is a belt 134 (Figure 4). Belt 134 is trained about and rotates a pulley 136 rotating a stub shaft 138. Stub shaft 138 is journaled in suitable bearings provided upon a rearwardly projecting member carried by the rear end wall 70.

To the front end of the stub shaft 138 there is fixedly secured a bevel gear 140, meshing with and rotating a bevel gear 141 affixed to an intermediate portion of a jack shaft 142. Jack shaft 142 extends transversely of the housing 58, being journaled in suitable bearings carried by the rear end wall 70 of said housing. The jack shaft 142 projects beyond the opposite sides of the housing 58, and affixed to the projecting ends of the jack shaft are pulleys 144, 144' about which are trained belts 146, 146'.

The belts 146, 146' pass about pulleys 148, 148' (Figure 3), secured to the shafts 124, 124'. The pulleys 148, 148', have sprockets 149, 149', respectively, connected thereto, the sprockets being part of sprocket and chain assemblies 150, 150'. The sprocket and chain assemblies 150, 150' extend along the opposite sides of the roll housing 58, being mounted upon the outer side walls of the troughs 64, 64'. The assemblies 150, 150' connect all the shafts 124 of the groups of cleaner rollers 120, 120' for joint rotation in the same direction, and as a result, it will be seen that bolls deposited in the side troughs will be given an initial cleaning by the elongated fingers 126, and will be transferred to the rear end of the housing.

Each of the shafts 104 of the stripper rolls 100 and 100', carry pulleys 163 and 163' respectively, the pulleys having sprockets 162 and 162' projecting therefrom. Shafts 117 of the brush rolls 116, 116' carry pulleys 164 and 164'. Belt 165 connects pulley 163' to pulley 164, and the belt 166 connects pulley 163 to pulley 164'. A sprocket chain 161 is trained over the sprockets 162 and 162' and also over a sprocket 160 carried by the shaft 128. By this described structure the stripper rolls 100 and 100' and the brush rolls 116 and 116' are driven.

Projecting forwardly from the leading end of the housing 58 are tapered blades 152, 152', said blades diverging in a direction away from the front end of the housing. Secured to the inner surface of each blade 152 are spring guides 154, 154', a plurality of said guides being secured to the blades 152, 152' as best shown in Figure 2.

It will be noted that the blades 152, 152', and their associated spring guides 154, 154' are so arranged as to cooperate in guiding plants into the open space between the front end of the stripper rolls 100, 100'. It will be observed, in this regard, that the tapering of the leading ends of the stripper rolls is adapted to define, between the stripper rolls, a tapered throat into which the blades 152, 152' will guide the plants to be stripped.

The stripper rolls are disposed at opposite sides of the longitudinally and centrally disposed bottom opening of the housing 58, and accordingly, after the plants are directed into the tapered throat, the plants will, during movement of the housing along the row, pass longitudinally of the bottom opening of the housing 58. The stripper rolls will rotate in opposite directions, as shown by the arrows in Figure 3, and will strip the bolls from the plants. The bolls will thus be carried upwardly, and will be engaged by the brush fingers of the rolls 116, 116'. The fingers of rolls 116, 116' will remove the bolls from the stripper rolls, and said bolls will then be directed by the brush rolls to the opposite sides of the housing, into the side troughs 64, 64'.

The conveying of the cotton bolls is aided by connecting in communication with the rear ends of the side troughs a pair of rearwardly converging ducts 156, said ducts communicating with one end of a main duct 158 extending to the blower housing 52. The blower is rotated in the housing in a direction to cause a suction to be set up within the ducts 156, 158, and as a result, the cotton bolls will be pulled out of the rear end of the housing, and drawn through the blower housing. The suction set up within the ducts 156, 158 will, as will be appreciated, also be set up within the roll housing 53, thus to aid in the movement of the bolls from the stripper rolls to the brush rolls, and from the brush rolls to the cleaner rolls, as well as the movement from the cleaner rolls to the rear end of the housing.

In use of the apparatus, the operation of the tractor along a drill row will cause the plants of said row to be acted upon in succession by the apparatus, thus to cause the bolls to be stripped from the several plants of the row. The bolls are continuously transferred to a suitable receiver, not shown, such as an accompanying wagon. It is important to note, in this regard, that the particular formation of the leading ends of the stripper rolls is such as to insure that all the plants will be guided into the space between said stripper rolls. At the same time, the brush rolls are formed complementarily to the stripper rolls at their leading ends, thus to be in full mesh with the stripper rolls throughout the lengths of both the stripper and the brush rolls.

This insures that not only will the plants be properly guided between the stripper rolls, but also will be properly cleaned of bolls by the apparatus. It may be noted that the staggering of the fingers on the tapered ends of the stripper rolls, relatively to the fingers on the constant diameter portions of the stripper rolls, insures that all bolls will be acted upon by the apparatus.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A cotton harvester comprising a roll housing; a pair of oppositely rotating stripper rolls spaced apart in said housing, said rolls including cylinders tapered for a part of the length at the leading ends thereof to define a tapered throat therebetween; finger support bars extending longitudinally of and spaced circumferentially about the respective cylinders, and radial stripper fingers mounted upon said bars so as to be arranged on the cylinders in circumferentially spaced, longitudinally extending rows, each cylinder having rows of stripper fingers mounted on the tapered portion thereof in rows offset circumferentially of the cylinder from the rows of fingers mounted on the remaining portion of the cylinder, said fingers of the respective stripper rolls constituting means to strip cotton bolls from plants entering the tapered throat and passing into the space between the rolls; a pair of oppositely rotating brush rolls in said housing, said brush rolls including cylinders having their leading ends flared for a part of the length of the brush rolls complementarily to the tapered leading ends of the stripper roll cylinders, said brush rolls further including radially extending brusher fingers arranged circumferentially of the brush roll cylinders in circumferentially spaced, longitudinally extending rows meshing with the stripper roll rows, the brushing rolls being disposed each adjacent a stripper roll to remove the bolls therefrom and pass the same to the opposite sides of the housing; and means at said sides of the housing for conveying the bolls rearwardly therefrom.

References Cited in the file of this patent

UNITED STATES PATENTS

| Number | Name | Date |
| --- | --- | --- |
| 243,554 | Haselton | June 28, 1881 |
| 1,763,607 | Watkins | June 10, 1930 |
| 2,001,077 | Thomann | May 14, 1935 |
| 2,001,078 | Court | May 14, 1935 |
| 2,001,079 | Court | May 14, 1935 |
| 2,451,130 | Townsend | Oct. 12, 1948 |
| 2,475,531 | Townsend | July 5, 1949 |
| 2,513,259 | Walker, Jr. | June 27, 1950 |